(12) United States Patent
Scheffler et al.

(10) Patent No.: US 6,393,354 B1
(45) Date of Patent: May 21, 2002

(54) PREDICTIVE CONTROL ARRANGEMENT FOR LOAD-FOLLOWING FUEL CELL-POWERED APPLICATIONS

(75) Inventors: Glenn W. Scheffler, Tolland; Paul R. Margiott, South Windsor; Zakiul Kabir, Glastonbury, all of CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/736,098

(22) Filed: Dec. 13, 2000

(51) Int. Cl.[7] .............................. G06G 7/70; F02C 7/36; H01M 8/00
(52) U.S. Cl. ............................ 701/99; 477/31; 429/12
(58) Field of Search ......................... 701/1, 7, 10, 22, 701/99–105, 107–108, 110–113, 123; 477/30–31, 182–187, 195, 205–207; 429/12–14, 19–27, 31, 33, 53, 140, 122–123

(56) References Cited

U.S. PATENT DOCUMENTS

| | | | |
|---|---|---|---|
| 4,729,930 A | 3/1988 | Beal et al. ..................... 429/13 |
| 4,859,545 A | 8/1989 | Scheffler et al. .............. 429/17 |
| 5,009,967 A | 4/1991 | Scheffler ....................... 429/23 |
| 5,290,641 A * | 3/1994 | Harashima ................... 429/17 |
| 5,316,869 A * | 5/1994 | Perry, Jr. et al. .............. 429/19 |
| 5,343,780 A * | 9/1994 | McDaiel et al. ............. 477/108 |
| 5,366,821 A | 11/1994 | Merritt et al. ................. 429/21 |
| 5,434,016 A | 7/1995 | Benz et al. .................... 429/13 |
| 5,771,476 A | 6/1998 | Mufford et al. ............... 701/22 |
| 5,991,670 A | 11/1999 | Mufford et al. ............... 701/22 |

* cited by examiner

Primary Examiner—William A. Cuchlinski, Jr.
Assistant Examiner—Thu Nguyen
(74) Attorney, Agent, or Firm—Stephen A. Schneeberger

(57) ABSTRACT

A method and system are provided for controlling a fuel cell power plant (10). A demand signal ($M_{ld}$) representing the anticipated current/power required by the electrical load(s) is provided. A current signal ($I_{ap}$) representative of the actual current drawn by the load(s) (20) is provided. The greater of the demand signal ($M_{ld}$) and the current signal ($I_{ap}$) is selected (46) and utilized to provide a control signal (Mx, Mx', Mx") for regulating one or more of the reactants and coolant (24). One or more status signals (Xp, Xp', Xp", Vap) indicative of the status of a regulated one of more of the reactant/coolant and/or a respective operating process effected, is provided. Each status signal is transformed to a respective load capability signal (61, 61', 61"). The lesser of the demand signal ($M_{ld}$) and each of the load capability signals (61, 61', 61") is selected (62) to provide an output signal ($M_i$) for commensurately controlling a system load (20, 32).

5 Claims, 2 Drawing Sheets

PREDICTIVE CONTROL ARRANGEMENT FOR LOAD-FOLLOWING FUEL CELL-POWERED APPLICATIONS

TECHNICAL FIELD

This invention relates to a system and method for controlling a fuel cell-powered system. More particularly, the invention relates to a predictive control arrangement for load-following fuel cell-powered applications and systems, such as vehicles and the like, which require rapid but not instantaneous response to operator requests.

BACKGROUND ART

Fuel cell power systems typically include one or more cell stack assemblies (CSA) supplied with a fuel reactant and an oxidant reactant, typically air, to provide an electrochemical reaction process to generate electricity. A coolant, such as water, may also be present as part of the process in the CSA, and water/steam may also be used the fuel supply process. Regulation of the reactant supplies and the ancillary coolant and/or water/steam supplies is typically used to control the process within the CSA and the operation of the fuel cell power plant.

Fuel cell power plant controls for stationary applications may be load-following or non-load following, usually depending upon whether the system is grid-connected or grid-independent. In the grid-independent mode, power plants must follow load changes instantaneously to prevent unacceptable voltage excursions. On the other hand, in other applications such as for powering the traction motor of a vehicle, the controls are required to be load following but need not be instantaneous to provide acceptable response from an operator standpoint. indeed, some degree of control resides in the operator who chooses the broad operating parameters of the system, such as changes in vehicle speed, temperature control, and the like. To the extent very gradual changes in the load are to be commanded, a relatively basic and simple control system may be suitable. On the other hand, because fuel cell response is instantaneous to increased demands in current output or load, the fuel cell may encounter a condition of reactant starvation, and in some instances even insufficient cooling, if the current or power demand exceeds the rate at which changes are, or can be, made in the supply of reactants or coolant to the CSA.

One such example of the challenge that may be encountered during a condition of transient load increases is described in U.S. Pat. No. 4,729,930 to Beal et al. There, a constant speed blower normally provides an adequate reactant air supply via a single modulated valve except during significant transient load increases. Then, the control system of that patent provides for energizing one or more quick opening auxiliary air valves in parallel with the modulated valve to promptly deliver an increased supply of air from the blower to the CSA during such transients. This provides an adequate supply of reactant air during load transients, but at the "cost" of a large fixed-speed blower and an array of controlled, rapidly opening valves Yet other patents, such as U.S. Pat. Nos. 5,771,476 and 5,991,670 to Mufford et al, describe systems for controlling the electric power output and oxidant supply in a fuel cell system for vehicles, particularly as a result of anticipated load demand. Those patents concern a system in which a variable speed compressor supplies the oxidant and comprises a very significant load in addition to the vehicle's traction motor. The electric power output of the CSA is dependent on the compressor's speed. To eliminate compressor revving and instabilities common to prior systems, a control system is provided which comprises a summing device for determining the total instantaneous power demand of the electrical loads based on a plurality of sensed power demand signals, and a processor for generating a feed-forward output signal for adjusting the compressor speed to a value predicted to give fuel cell power output sufficient to satisfy the instantaneous power demand. Although addressing the problem of compressor revving and instability, this approach continues to run the risk of starving the CSA of one or more of its process-controlling components, such as oxidant reactant, if the load transient increases, or is allowed to increase, at a rate that is too rapid relative to the process-controlling variable(s) being controlled.

In view of the foregoing, it is an object of the invention to provide a predictive control arrangement for following load transients in a load-following fuel cell system which minimizes or eliminates starvation of the CSA during load transients. Other objects and advantages of this invention will become more readily apparent when the following description is read in conjunction with the accompanying drawings.

DISCLOSURE OF INVENTION

The present invention is an arrangement for controlling one or more fuel cell stack assemblies (CSA) in a fuel cell power plant in load-following applications, such as powering automotive vehicles, in a manner which reduces, minimizes, or eliminates CSA starvation during electrical load transients.

Accordingly, the present invention comprises a method and system for controlling a fuel cell power plant in a predictive manner providing rapid response of the CSA-powered system without creating an unacceptable condition of CSA starvation which may be caused by instantaneous electrical load transients. The control system and method of the invention are for use in a fuel cell-powered system having a CSA for providing electrical power to one or more electrical loads controllably connected thereto and having respective sources of fuel and oxidant reactants and coolant for effecting the operation, or process, of the CSA. The method of controlling the system in an anticipatory manner to minimize or eliminate reactant starvation and/or insufficient cooling during load transients comprises providing a demand signal representative of the anticipated current or power required by the one or more electrical loads; providing a load signal representative of the actual current or power drawn by the one or more loads connected to the CSA; selecting the greater of the demand signal and the load signal and providing a control signal for regulating one or more of the reactants and coolant to effect the process of the CSA; providing one or more process status signals indicative of the status of the process effected; converting each of the one or more process status signals to a respective load capability signal; and selecting the lesser of the demand signal and each of the respective load capability signals to provide an output signal for commensurately controlling a system load.

Further, the step of providing a control signal comprises transforming the selected load signal to a nominal setpoint signal as a function of the correlation between load current and the respective one or more of the reactants and coolants to be regulated. That step of providing the control signal may further comprise comparing the selected and transformed nominal setpoint signal with one or more process feedback signals, such as status signals of the operating process effected, to thereby provide an error signal, and summing a function of the error signal with a function of the selected and transformed nominal setpoint signal.

A corresponding control system, including a suitable controller, is provided to effect the steps of the method of controlling the CSA and associated loads as mentioned above.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
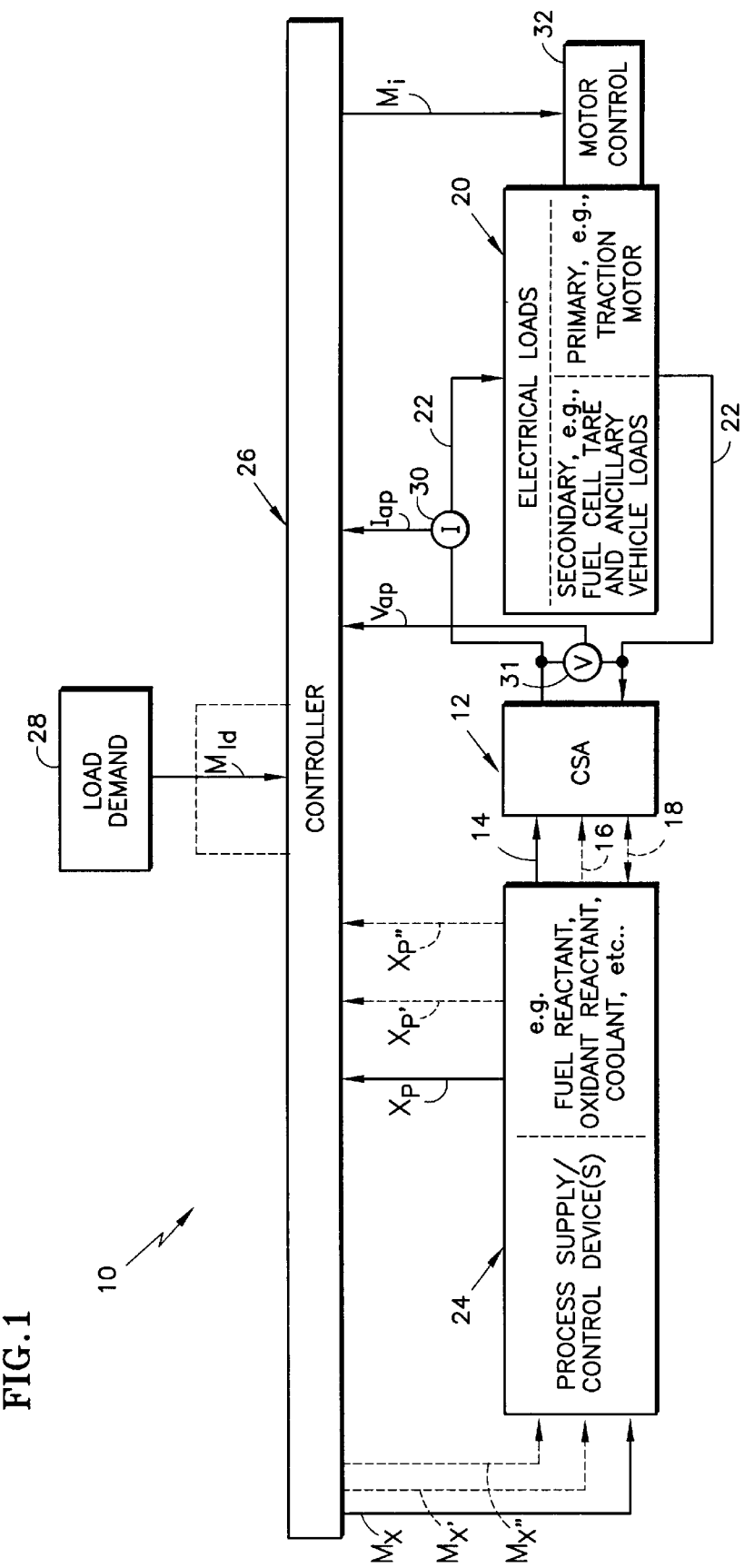
FIG. 1 is a generalized functional flow diagram of a fuel cell-powered load application and the associated control system of the invention.

Referring to FIG. 1, there is depicted a generalized functional flow diagram of a fuel cell-powered system 10, including the load application and the associated control system in accordance with the invention. A fuel cell stack assembly 12, hereinafter CSA 12, represents the one or more electrical power sources which provide electrical power as the result of the well known electrochemical reaction of the fuel cells. The CSA 12 may be any of several conventional types, but in the illustrated embodiment is preferably of the polymer electrolyte membrane (PEM) type. CSA 12 typically includes an anode portion, a cathode portion, an intermediate electrolyte matrix or polymer film portion, and appropriate coolant channels. The anode portion receives the fuel reactant, a hydrogen-rich stream, via a path designated 14. The hydrogen may be stored and supplied in the basic elemental form, or may be the result of a reformation process. The cathode portion receives an oxidant reactant, typically air, via a path designated 16. Coolant to and from the CSA 12 is via a path designated 18.

The CSA 12 provides electrical power for various types of electrical loads. In the present instance, the primary load applications are load-following, as for instance the powering of an electrical traction motor to propel a vehicle. The CSA 12 is also required to provide electrical power to other electrical loads required to actually support and conduct the electrochemical process of the CSA 12 and its ancillary systems. Accordingly, CSA 12 is depicted as providing electrical power to an "Electrical Loads" function block, generally designated 20, via electrical leads 22. The Electrical Loads block 20 is further depicted as being divided into the primary load portion designated "PRIMARY, e.g., TRACTION MOTOR" , and the secondary load portion designated "SECONDARY, e.g., FUEL CELL TARE and ANCILLARY VEHICLE LOADS" . The fuel cell tare loads include, or may include, one or more of the following: coolant pump(s), air blower(s), compressor, reactant valve controllers and actuators, coolant valve controllers and actuators, fans, reformer steam valves and actuators.

The various supply/control devices for controlling the electrochemical operation, or process, in the CSA 12 are represented by the similarly identified block 24. Examples of those devices include fuel reactant valves, oxidant reactant valves, coolant pump and valves, air blower, reformer steam valve, compressor, etc. The various supply/control devices of block 24 receive respective control signals $M_x$, $M_{x'}$, $M_{x''}$, etc. provided by a controller 26. Similarly, feedback, or status, signals $X_p$, $X_{p'}$, $X_{p''}$, etc. indicative of the respective states or conditions of the respective supply/control devices of block 24 are fed back to the controller 26. The controller 26 is typically a microprocessor-based programmable logic controller of conventional design and suitably programmed in a known manner to perform the functions of the invention hereinafter described in greater detail. The controller 26 may receive analog, discrete and/or digital signals as inputs and provides signals of similar form as outputs in accordance with the overall control scheme.

One or more load demand devices, collectively represented by block 28, provide input signals used to establish a. Load Demand signal which is designated $M_{ld}$ and represents the total desired load. In an automotive application, the principal load demand will be that of a traction motor for driving the vehicle under different operating conditions and regimes. The load demand device for generating a signal to control the traction motor is typically an accelerator pedal. Secondary load demand devices may similarly provide demand signals to control other loads, such as for heating, ventilating and/or air conditioning a vehicle. The Load Demand signal $M_{ld}$ may be expressed as current or power and may be developed externally of controller 26, or as depicted herein, may be developed in controller 26 as the result of inputs provided by load demand block 28, for ultimately establishing the required operating level of the CSA 12 for the anticipated total load, as will be described in greater detail with reference to FIG. 2.

The control signals $M_x$, $M_{x'}$, $M_{x''}$, etc., provided as outputs by the controller 26, serve to appropriately control the respective process supply/control devices of block 24 to effect the requisite response of the CSA 12 to support the estimated load demand by the load(s) 20.

The development of those control signals $M_x$, $M_{x'}$, $M_{x''}$, etc., is based principally upon a feed-forward signal value developed from the Load Demand signal $M_{ld}$. However, they also rely on the corrective inclusion of an error signal component developed by providing feedback indicative of the status of the respective process supply/control devices of block 24 via the status signals $X_p$, $X_{p'}$, $X_{p''}$, etc. and comparing with the load demand signal(s) fed forward, as will be described in greater detail with reference to FIG. 2.

The actual current or power being output by the CSA 12 is measured, as for instance, by current output monitor 30, and is fed to controller 26 as signal $I_{ap}$, which may be expressed in terms of current or power. The $I_{ap}$ signal is used as a control parameter, as will be described hereinafter. The output voltage across CSA 12 is measured by voltage output monitor 31 and represented as signal $V_{ap}$. The actual current or power signal $I_{ap}$ and/or the output voltage value $V_{ap}$ may also be viewed as signals indicative of the status of the process effected in the CSA 12, and may be used for further control purposes. Further, the controller 26 provides a control signal $M_i$ as an output to a motor controller block 32. The motor controller block 32 is representative of the DC to DC converter and/or motor controller associated with the traction motor, and translates the control signal $M_i$ to the commensurate traction motor output.

Figure 2:
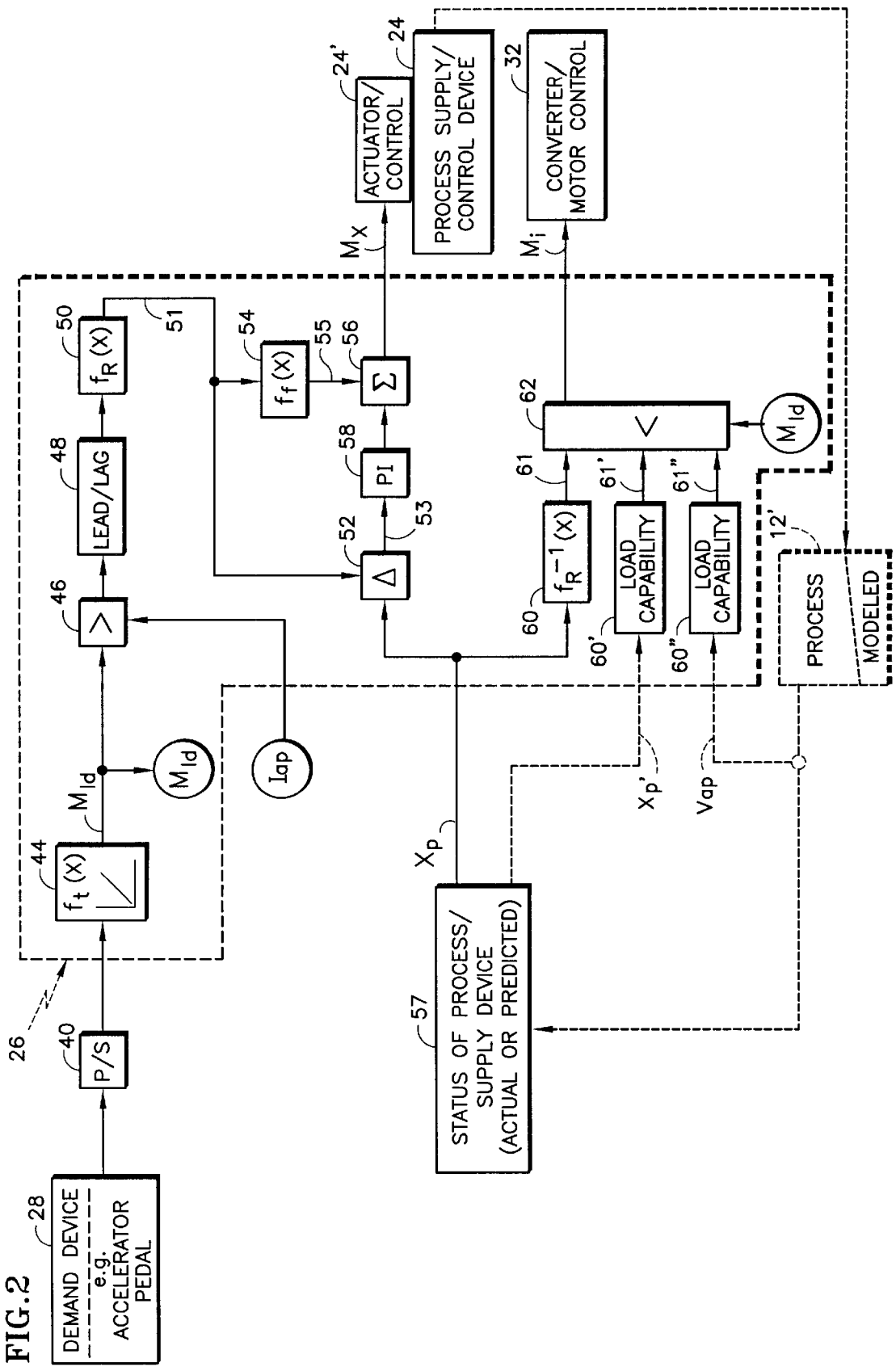
FIG. 2 is a more detailed functional schematic and flow diagram, illustrating the fuel cell and load control arrangement of the invention.

Referring additionally to FIG. 2, there is depicted a more detailed functional schematic and flow diagram of the fuel cell and load control arrangement of the invention, particularly with respect to the development of the control signal(s)

$M_x$ for controlling the process supply/control device(s) which effect(s) the operation, or process, of the CSA 12 and the development of the load controlling signal(s) $M_i$ as for controlling the traction motor. For the purpose of simplicity and specificity, the control scheme of FIG. 2 is limited to the illustration and description of an arrangement having a singular preferred demand device used to develop a signal for controlling a singular preferred supply device and a signal for controlling a singular preferred load device. However, it should be understood that variations in both the number and type of the illustrated demand devices, supply devices and load devices is contemplated.

A load demand device 28, in this instance an accelerator pedal, provides the primary input to the system for establishing the load demand on the CSA 12 by the electrical loads 20, and particularly the traction motor. The accelerator pedal is typically under the operator's control and is used to command a change, or maintain the status quo, with respect to the speed of the vehicle being operated. A suitable transducer 40, as for instance a potentiometer, converts the position of the accelerator pedal to a commensurate electrical signal representative of that position. That position signal may then be converted from an analog to digital state by A-to-D converter (not shown), assuming such is appropriate for the controller 26 being used. Similarly, other signals discussed herein will be converted to the appropriate analog or digital state as required, without further mention. The resulting, partly-processed signal from the demand device 28 is then fed to $f_t(x)$ function block 44 which provides a throttle (accelerator) output signal $M_{ld}$ indicative of the desired load. The $f_t(x)$ function, depicted graphically in block 44, converts the accelerator (throttle) signal to an equivalent DC current value representative of load current output of the CSA 12, for use as a load command signal, but alternatively could be expressed as power. Similarly, although the $f_t(x)$ function block 44 is depicted in FIGS. 1 and 2 as being part of controller 26, that function may alternatively be provided externally of the controller, and the signal $M_{ld}$ would then be an input to the controller 26.

The throttle output signal $M_{ld}$, representative of the total desired load, is shown in FIGS. 1 and 2 as being an input to the controller 26 (partly shown in broken lines in FIG. 2). However, it should be understood that the conversion provided by function block 44 might be included as part of controller 26. In accordance with an aspect of the invention, the throttle signal $M_{ld}$ is applied as one input of a "greater select" function block 46, the other input being the $I_{ap}$ signal which indicates the actual output load current/power from CSA 12. The greater select function 46 operates to pass the greater of the two input signals, and may be provided by a logic "if" function. As will be seen, this ensures that the reactant and/or coolant flow(s) being controlled by the ultimate signal do not inadvertently fall below the actual process demand of the CSA 12 and loads 20. This is particularly necessary for "down-transients" when the accelerator positioning requests a decrease in load.

The output from the greater select 46 may be provided dynamic compensation via the optional lead/lag function block 48, following which it is applied as the input to $f_R(x)$ function block 50.

The $f_R(x)$ function 50 represents the schedule, which may be a look-up table or a function generator, for providing an output to serve as the setpoint value for the process supply/control device(s) being controlled. In the representative example, the device is typically an oxidant or fuel reactant control valve and/or an air blower motor. If diverse devices are being controlled, then respective functions for each are required and incorporated. The setpoint value represents the desired operating level of the particular process-controlling device in order to attain or maintain the demanded output of the CSA 12, as established by the signal passed by the greater select 46.

The output of block 50 is extended, as a nominal setpoint value 51, to a feed-forward function $f_f(x)$ block 54 where block 54 converts the desired flow (or speed) value from block 50 to a nominal control output signal 55, and, as depicted here, to a classical feedback controller which "tunes" or "adjusts" the feed-forward output before sending its signal to the control.

It will be appreciated and understood that the "feedback" and "feedforward" discussed here is depicted in form and terminology familiar to classical control theory, but is applicable in the generic sense, and that modern control theory that employs the concept of predictors/correctors and/or other programmed equations to obtain the corrective effect is similarly embraced.

The feedback controller performs its function by first comparing, at comparator 52, the setpoint value 51 to a status signal $X_p$, which is fed back and serves as an indicator or measure of the response or status of the process supply device status. An error signal 53 from comparator 52 is provided with proportional and integral (PI) control in a known manner at block 58, and the resulting signal is extended to an input of summer 56. At summer 56, the nominal feed-forward setpoint signal 55 fed forward from block 50 via block 54 is "tuned" or "adjusted" by summing with the feedback error signal, and this summing provides the device control signal $M_x$ as the resulting output.

The device control signal $M_x$ is provided as an output from the controller 26, and is connected to control the relevant process supply/control device 24 via an associated actuator/control 24' for the device. For instance, if the device 24 is a reactant flow control valve, the associated actuator 24' may be a valve actuator or driver, or if device 24 is an air blower for the oxidant reactant, the associated actuator 24' may be the blower motor and/or its drive circuitry. The device control signal $M_x$ thus is formulated to increase reactant or coolant flow during up-transients prior to the application of load and delay the reduction in reactant flows during down-transients until the actual applied load decreases as measured by $I_{ap}$ depicted in FIG. 2.

In accordance with another aspect of the invention, provision is made in controller 26 for controlling power to the primary load, or loads, such as the traction motor of block 20. Referring to the lower portion of FIG. 2, the device status signal $X_p$ also provides an input to $f_R^{-1}(x)$ function block 60 which is the inverse schedule or function of that presented in the $f_R(x)$ function block 50. In other words, whereas function block 50 converted an equivalent load current/power demand signal to a control value for a particular process supply/control device, the function block 60 converts the status value fed back from that particular process supply/control device, e.g., mass flow of oxidant or fuel, to an equivalent load current/power value representative of the measured process capability, and is designated load capability signal 61. Additional process parameters may be monitored to signal the load capability of the system based on their instantaneous status. For instance, the status of yet another process/supply device, as represented by the signal $X_{p'}$, may be applied to yet another "Load Capability" function block 60' to provide a further load capability signal 61'' based on the status of that process/supply device. Still further, a signal representative of the status of the CSA 12 itself, as for instance the actual output voltage $V_{ap}$, may be applied to a further "Load Capability" function block 60" to provide a further load capability signal 61".

The term "status signal" as used herein is intended in the broadest sense as an indicator, whether actual or predicted as from modeling, of the status of a device or parameter in the operating process. The status signal $X_p$, shown here for convenience as eminating from a block 57 and serving to provide feedback to the comparator 52 of the feedback controller, is typically an actual measure of a/the device or parameter being controlled. However, the status signal(s) from block 57 may alternatively, or additionally, be a predicted or modeled value which is representative or otherwise indicative of a particular parameter. This latter condition is particularly applicable when the signal is used as an input to the load capability functions 60, 60', and the status signals may be used as feedback, for control or otherwise, or as a modeled value. Similarly, the status signal $V_{ap}$ applied to load capability function block 60" might alternatively be modeled. Further still, although the status signals $X_p$, $X_{p'}$ etc., from block 57 are depicted as being developed substantially external to controller 26, modeling or conditioning of some or all of those signals may alternatively occur in, or by, controller 26. A broken-line lead is shown in FIG. 2 as extending from Process Supply/Control Device block 24 through a broken line "Process/modeled" block 12' and to block 57 to indicate the sources of the various status signals. The "Process" 12' is representative of the process parameters associated with the operation of and output by, the CSA 12. Although not depicted as an "$X_p$" status signal from block 57, the $V_{ap}$ signal applied to "Load Capability" function block 60' is nonetheless a status signal indicative of the process effected.

The load capability output signal 61 from function block 60 is applied to an input of a "lesser select" circuit 62, load capability signals 61' and 61" are similarly extended to respective other inputs of circuit 62, and the throttle signal $M_{ld}$ described above is applied to yet another input of block 62. The lesser select function 62 may be a logic "if" function, and operates to pass to its output only the lesser, or least, of the two or more input values, which output signal is the $M_i$ control signal mentioned earlier. The $M_i$ control signal is applied to the motor controller block 32 for controlling the torque/speed response of the traction motor. By selecting only the lessermost (i.e., least) of the two or more input values, down-transient capability is provided by commanding the traction motor to reduce power if the operator relaxes the accelerator pedal. This instantaneous response during down-transients provides essential response to operator command during normal driving, and is an important safety feature for emergency braking. Moreover, on up-transients where the estimated demand has been increased, the lesser select serves to prevent reactant starvation of the CSA 12 by ensuring that the power delivered to the loads, and particularly the traction motor, is not increased too quickly. This occurs because the lesser select 62 will not allow an "increased" throttle demand signal $M_{ld}$ to become the motor drive control signal $M_i$ until the one or more load capability signals 61, 61', 61", etc. cumulatively indicate a sufficient supply state of the relevant reactant by the relevant supply device and/or sufficient output load capacity of the CSA 12 directly. Until then, the lesser of the one or more status signals serves as the source of the motor drive control signal $M_i$.

Although the invention has been described and illustrated with respect to the exemplary embodiments thereof, it should be understood by those skilled in the art that the foregoing and various other changes, omissions and additions may be made without departing from the spirit and scope of the invention. For instance, the demand signal may be provided by a manual input or an automatic input for controlling power to not only a traction motor, but to other types of loads such as heating, ventilating and/or air conditioning loads. Also, the process supply device, or devices, may be plural and diverse, with appropriate schedules or transfer functions associated with each to translate the demand signals to the appropriate context. Additionally, the control design can adjust (or eliminate) the contributions of various feedback and feed-forward control functions by adjusting control algorithms or gains.

What is claimed is:

1. For use in a fuel cell-powered system (10) having a fuel cell stack assembly (CSA)(12) for providing electrical power to one or more electrical loads (20) controllably connected thereto, and having respective sources of fuel and oxidant reactants and coolant (24) for effecting the operating process of the CSA, the method of controlling the fuel cell-powered system in an anticipatory manner to minimize or eliminate reactant starvation or insufficient cooling during load transients, comprising the steps of:

(a) providing a demand signal ($M_{ld}$) representative of the anticipated current or power required by the one or more electrical loads;

(b) providing a load signal ($I_{ap}$) representative of the actual respective current or power drawn by the one or more loads connected to the CSA;

(c) selecting (46) the greater of the demand signal ($M_{ld}$) and the load signal ($I_{ap}$) and providing therefrom a control signal ($M_x$) for regulating one or more of the reactants and coolant to effect the operating process of the CSA;

(d) providing (24) one or more process status signals ($X_p$, $X_{p'}$, $X_{p''}$, $V_{ap}$, etc.) indicative of the status of a respective regulated one or more of the reactants and coolant or of a respective operating process effected;

(e) transforming (60, 60', 60") each of the one or more process status signals ($X_p$, $X_{p'}$, $X_{p''}$, $V_{ap}$, etc.) to a respective load capability signal (61, 61', 61", etc.); and (f) selecting (62) the lesser of the demand signal ($M_{ld}$) and each of the one or more respective load capability signals (61, 61', 61", etc.) to provide an output signal ($M_i$) for commensurately controlling (32) a system load (20).

2. The method of claim 1 wherein, in step (c), the step of providing a control signal ($M_x$) comprises transforming (50) the selected current or power-based signal to a nominal setpoint signal (51) as a function ($f_R(X)$) of the correlation between load current or power and the respective said one or more of the reactants and coolant to be regulated.

3. The method of claim 2 wherein, in step (c), the step of providing a control signal ($M_x$) further comprises comparing (52) the selected and transformed nominal. setpoint signal (51) with the one or more process status signals ($X_p$, $X_{p'}$, $X_{p''}$, etc.) which are feedbacks of the operating process effected to provide an error signal (53), and summing (56) a function of the error signal (53) with a function of the selected and transformed nominal setpoint signal (51).

4. The method of claim 2 wherein the step of transforming (60) one or more process status signals ($X_p$, $X_{p'}$, $X_{p''}$, etc.) to a respective load capability signal (61) is substantially the inverse of the step of transforming (50) the selected current or power-based signal to a nominal setpoint signal (51).

5. A control system (24, 26, 28) for providing electrical power from a fuel cell-powered (12) electrical supply system (10) to one or more loads (20) in an anticipatory manner to minimize or eliminate reactant starvation during load transients, comprising:

(a) a fuel cell stack assembly (CSA) (12);

(b) one or more electrical loads (20) controllably connected to the CSA;

(c) respective sources of fuel and oxidant reactants and coolant (24) operatively connected to the CSA (12) for effecting the operating process of the CSA (12) in response to one or more control signals; and (d) a control system, comprising:

(1) a device (28) for providing a demand signal ($M_{ld}$) representative of the anticipated current or power required by the-one or more electrical loads;

(2) a device (30) providing a current or power signal ($I_{ap}$) representative of the actual current or power drawn by the one or more loads (20);

(3) a controller (26) for selecting the greater of the demand signal ($M_{ld}$) and the current signal ($I_{ap}$) and providing therefrom a control signal ($M_x$) for regulating one or more of the reactants and coolant to effect the operating process of the CSA;

(4) a device (57, 31, 12') providing one or more process status signals ($X_p$, $X_{p'}$, $X_{p''}$, $Va_p$, etc.) indicative of the status of a respective regulated one or more of the reactants and coolant or of a respective operating process effected;

(5) the controller (26) transforming (60, 60', 60") the one or more process status- signals ($X_p$, $X_{p'}$, $X_{p''}$, $V_{ap}$, etc.) to a respective load capability signal (61); and (6) wherein the controller (26) further selects the lesser of the demand signal ($M_{ld}$) and each of the respective load capability signals (61, 61', 61" ) to provide an output signal ($M_i$) for commensurately controlling (32) a system load (20).

* * * * *